United States Patent [19]

Baldwin et al.

[11] Patent Number: 4,944,325

[45] Date of Patent: Jul. 31, 1990

[54] BUTTERFLY VALVE FOR EROSIVE FLUID STREAMS

[75] Inventors: Stanley L. Baldwin, Winnipeg; Charles W. Berscheid, Manitoba, both of Canada

[73] Assignee: INCO Limited, Toronto, Canada

[21] Appl. No.: 422,945

[22] Filed: Oct. 16, 1989

[30] Foreign Application Priority Data

Nov. 29, 1988 [CA] Canada .................. 584475

[51] Int. Cl.⁵ ............................................. F16K 51/00
[52] U.S. Cl. ..................................... 137/375; 251/109; 251/308; 251/367
[58] Field of Search ................ 137/375; 251/219, 367, 251/109, 305, 308

[56] References Cited

U.S. PATENT DOCUMENTS

| 867,780 | 10/1907 | Auchu | 137/375 |
|---|---|---|---|
| 2,809,060 | 10/1957 | Thompson | 288/1 |
| 3,192,945 | 7/1965 | Blakeley | 137/375 |
| 3,394,914 | 7/1968 | Nagasato | 137/375 |
| 3,498,315 | 3/1970 | Graves et al. | 137/375 |
| 3,750,698 | 8/1973 | Walchle et al. | 137/375 |
| 3,753,549 | 8/1973 | Rubright | 251/305 |
| 3,804,366 | 4/1974 | Rubright | 251/305 |
| 3,958,595 | 5/1976 | Al et al. | 137/375 |
| 4,148,458 | 4/1979 | Holtgraver | 137/375 |

OTHER PUBLICATIONS

"Duro Butterfly Valve", Duriron Co., Inc., Dayton, Ohio, Feb. 1966.

Primary Examiner—A. Michael Chambers
Attorney, Agent, or Firm—Francis J. Mulligan, Jr.; Edward A. Steen

[57] ABSTRACT

A butterfly valve having a central cavity larger than the access ports. A disc is disposed within the central cavity to sealingly engage the interior of the valve. A molded elastomeric liner covers the interior of the valve and the disc. By utilizing a central cavity of larger cross sectional area than the access ports, internal valve and downstream pipe turbulence is reduced resulting in increased component lifetimes.

4 Claims, 2 Drawing Sheets

BUTTERFLY VALVE FOR EROSIVE FLUID STREAMS

TECHNICAL FIELD

The instant invention relates to valves in general and, more particularly, to a butterfly valve especially adapted to withstand the extraordinary rigors posed by abrasive sandfill lines.

BACKGROUND ART

Butterfly valves generally consist of a valve housing and a rotatable disc sealably disposed within the housing. Standard coupling means connect the valve to adjacent tubes and pipes.

The rotatable disc is pivotally mounted within the housing to project a perpendicular face to the direction of fluid flow in order to close the valve. Conversely, the valve is fully opened by rotating the disc in a plane essentially parellel to the fluid flow. Infinite gradation of "openness" and "closedness" are permissible.

Butterfly valves may be found with metal discs tightly seating against the metal interior of the valve body as well as with various combinations of polymeric coated components within the interior of the valve. Representative designs of the latter types may be found in U.S. Pats. No. 3,750,698; 3,958,595; 3,753,549; 3,804,366; and 2,809,060.

A dificulty encountered with available butterfly valves is when they are used to control flowing sandfill in underground excavations. After an area is opened or mined out, it is usually supported or closed up in some fashion to reduce the number of dangerous voids in the mine. One such technique is introduce cementious fill into the void. Sandfill, comprised essentially of small erosive sand particles suspended in a water slurry, is piped to the desired location. Sandfill moving at pumped velocities easily abrades piping components. Valve structures, such as seats, discs, pivoting assemblies, the interior of the valve housing etc., are literally destroyed in short order. The valves fail when they begin to leak; refuse to open or close to the desired orientation; and eventually jam. In large excavation, the expense and effort needed to repair and ultimately replace the damaged valves becomes excessive. Downtime simply compounds the problem.

Currently available valve designs simply have not withstood the demands placed upon them.

SUMMARY OF THE INVENTION

Accordingly, there is provided a butterfly valve especially suited for, but not limited to, sandfill delivery systems and other erosive fluid streams. The valve includes a coated disc and a coated valve interior. The housing of the valve broadens in the vicinity of the centrally disposed disc so as to enable the disc to have a greater diameter than the ends of the valve. This effectively slows down the velocity of the sandfill flow within the critical disc/valve body seating interface thereby extending the lifetime of the valve.

PREFERRED MODE FOR CARRYING OUT THE INVENTION

Figure 1:
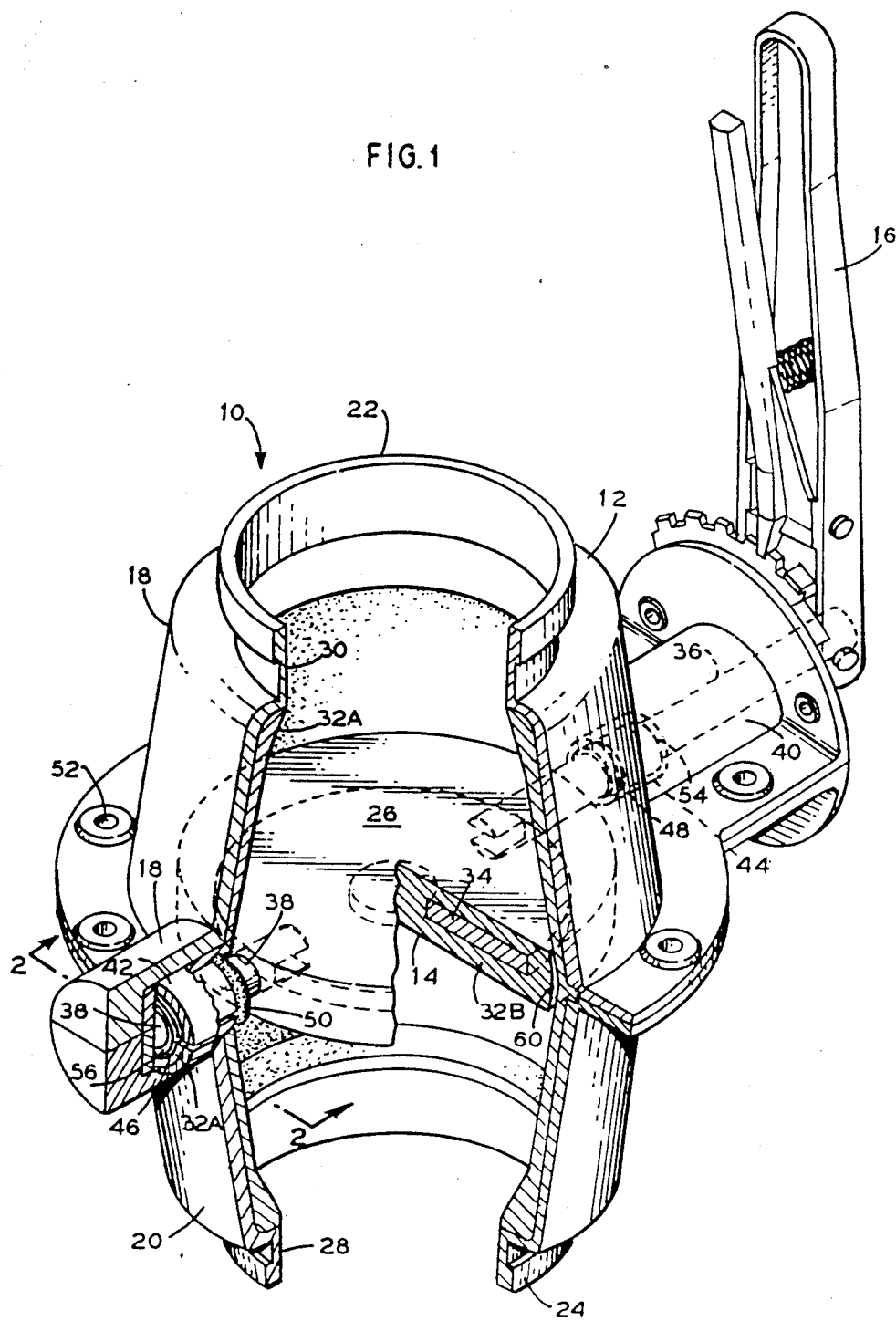
FIG. 1 is a projection, partially cut away, of an embodiment of the invention.

Referring to FIG. 1 there is shown a butterfly valve 10. The valve includes body 12, disc 14 and actuator 16.

The body 12 is comprised of two frustoconical body segments 18 and 20 and pipe coupling surfaces 22 and 24. Each body segment 18 and 20 diverges toward the interior of the body 12 so that the diameter of the middle of the body interior 26 is wider than the diameter of the ports 28 and 30.

The interior of the body 12, which may be fabricated from steel, is lined with a suitably abrasive resistant material 32A such as urethane or other polymeric material that can be molded to adhere to the interior surface of the body 12.

Similarly, the disc 14 may be coated with the same polymeric liner 32B. The disc may be fabricated with a metal core ring 34. The disc 14 is sized to seal the widest portion of the body interior 26, i.e., the outside diameter of the disc 14 sealably accommodates the internal diameter of the body interior 26 at its widest point where the segments 18 and 20 are joined together.

The disc 14 is pivotally suspended within the body 12 by shafts 36 and 38 extending into support cavities 40 and 42. Split keeper bushings 44 and 46 are disposed within the support cavities 40 and 42 between the shafts 36 and 38 and the liner 32A to permit the disc 14 to rotate. Bearings 54 and 56, preferably made from brass, are affixed to the shafts 36 and 38. Seals 48 and 50 prevent damage to the valve and reduce leakage.

Bolt holes 52 accommodate bolts and nuts or other appropriate fasteners.

Figure 2:
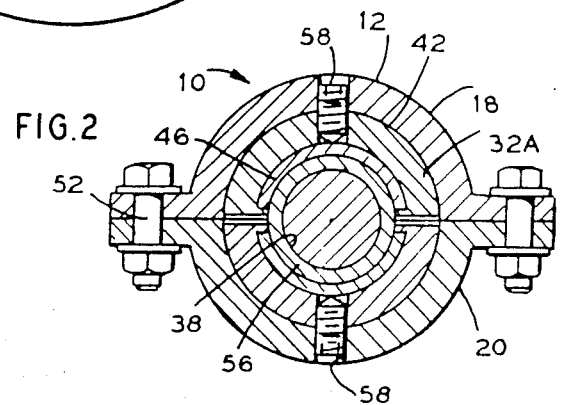
FIG. 2 is a view taken along line 2—2 of FIG. 1.

FIG. 2 shows a cross sectional view of the valve 10 taken along lines 2—2 of FIG. 1.

Screws (not shown) are permanently disposed in screw holes 58 during the liner 32A molding operation to hold the keepers 44 and 46 in place.

Figure 3:
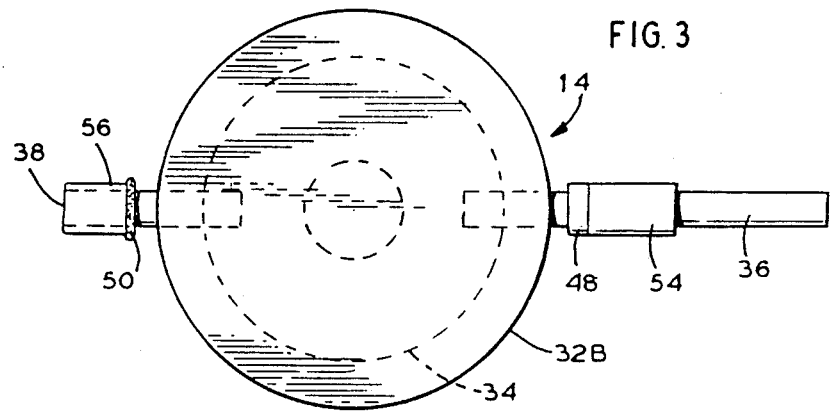
FIG. 3 is an elevation of a feature of the invention.

FIG. 3 is a detailed view of a disc 14. It includes the liner 32B enveloping the core ring 34. The upper portion of the shaft 36 is shaped to be affixed to the actuator 16.

Figure 4:
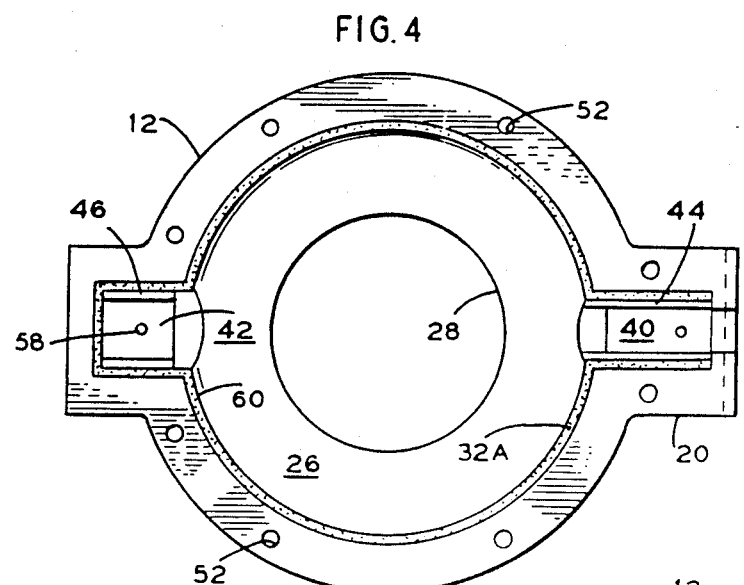
FIG. 4 is a cross sectional view of an embodiment of the invention.

FIG. 4 shows a body segment 20. The body interior 26 is wider than the port 28 to permit a reduction in the slurry velocity in the critical vicinity of the disc 14/interior 26 seat interface.

For the purposes of non-limiting example, FIG. 1 shows the valve 10 in a closed position. Under these circumstances, the disc 14 lies in a plane substantially parallel to the widest internal dimension 60 of the lined body 12. The periphery of the liner 32B must tightly seal against the liner 32A along dimension 60. Using the segemented contruction 18 and 20, The dimension 60 is located essentially at the intersection of the widest ends of the segments 18 and 20.

The invention and the matter of applying it may, perhaps, be better understood by a brief discussion of the principles underlying the invention.

By utlizing a unique split body 12 comprising two matched segments 18 and 20, the instant valve 10 may be easily fabricated. By splitting the body 12 verically through the plane of dimension 60, the disc 14 may be inserted into the valve 10 which is then bolted (or otherwise fastened) together. Both sides of the liner 32A are first molded into place within the respective segments 18 and 20 by a reverse mold corresponding to the physical dimensions of the segment interiors. Preferably polyurethane is caused to be molded to shape and adhere to the segments 18 and 20. Prior to the commencement of the molding operation, the split keeper bushings 44 and 46 are inserted into the support cavities 40 and 42. The bushings 44 and 46, when brought together, circumscribe the two bearings 54 and 56 of the disc 14. The liner halves 32A automatically seal the edges of the body interior 26, when the segments 18 and 20 are joined together.

The disc liner 32B is molded over the core ring 34 in a standard manner.

The thrust of the instant valve design is the utilization of a wide central interior and smaller ports. The disc 14 diameter is larger than the pipe coupling surfaces 22 and 24. By opening up the interior of the valve, internal turbulene and abrasive wear is reduced since the velocity of the fluid is reduced at the disc 14/body 14 interface; i.e., dimension 60.

In a test program, conducted at assignee's mines in Thompson, Manitoba, the valves 10 were placed in a 4 inch (10.16 cm) diameter sandfill slurry pipe. The valves 10 were constructed to have a 5 inch (12.7) diameter body interior. (Internal diameter is measured from liner wall to liner wall at the widest point 60 of the body interior 26 or, similarly, the diameter of the coated disc 14).

As a bonus, by reducing turbulence within tthe valve 10, it was discovered that downstream pipe component wear was considerably decreased as well. It is hypothesized that the instant valve design leads to a flow straightening action. Any smoother flow if moving erosive materials is welcome. Initial tests appear to show a 56 fold increase in valve life when compared to standard plug valve designs. similarly there appeared a 20 fold decrease in downstream pipe wear.

Some representatives experimental results are shown in the table below:

TABLE

It is preferred to utilize stainless steel in the fabrication of the shafts 36, 38 and the core ring 34 since corrosion is always a factor to be reckoned with.

The instant design lends itself to expeditious repair. The segments 18 and 20 may be split apart and the liner 32A and 32B, disc 14, bushings 44 and 46, and bearings 54 and 56 refurbished as necessary.

That is, since 471 plug valves were needed when 561,000 tons ($5.09 \times 10^8$ kg) were poured in 1986, it was estimated that 617 plug valves would be needed for the expected 900,000 tons ($6.35 \times 10^8$ kg) to be poured in 1987. The estimated number of valves (205 and 11) are also based upon previous experiences and the test.

Based upon the estimated 1987 mass pouring, the test were normalized to 285 tons/hour for comparison purposes. This results in a approximate life of four hours for the conventional plug valve, twelve hours for the ball valve, and 231 hours for the instant valve. Applying these numbers to the 1987 mass poured rates leads to the estimated number of valves required and the "Efficiency".

Although the handle 16 is depicted in FIG. 1 as being turned 90 degress from the disc 14, it should be appreciated that in normal practice, the handle 16 is usually parallel with the plane of the disc 14. This, of course, provides an instant visual indication of the status of the valve 10; that is, whether it is open, closed or in between.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. An erosive fluid butterfly valve, the valve comprising a housing formed by two flanged frustoconical body segments joined at their widest ends, the widest ends when joined defining a maximum internal diameter plane, the body segments including two opposed extensions that form first and second support cavities coincident with the maximum internal diameter plane, an access port disposed at the opposed end of each body segment, a rotatable disc disposed within the housing, the disc including opposed shafts extending into the first and second support cavities, split bushings disposed about the shafts in the first and second support cavities, erosion resistant liner material enveloping the disc and

| | 4 INCH (10.16 cm) SANDFILL BUTTERFLY VALVE TEST | | | | | |
|---|---|---|---|---|---|---|
| Valve Type | Hours Poured | Mass Poured | Mass/Hour | 1987 Mass Poured | No. Valves Required* | Efficiency |
| Current Plug Valve | 4 | 1140 tons ($1.03 \times 10^6$ kg) | 285 tons/Hr ($2.58 \times 10^5$ kg/hr) | *700,000 tons ($6.35 \times 10^8$ kg) | 614 | 1140 ($1.03 \times 10^6$) |
| Conventional Ball Valve | 12 | 3420 tons ($3.10 \times 10^6$ kg) | 285 tons/Hr ($2.58 \times 10^5$ kg/hr) | *700,000 tons ($6.35 \times 10^8$ kg) | 205 | 3415 ($3.05 \times 10^6$) |
| Instant Butterfly Valve | 231 | 65835 tons ($5.97 \times 10^6$ kg) | 285 tons/Hr ($2.58 \times 10^5$ kg/hr) | *700,000 tons ($6.35 \times 10^8$ kg) | 11 | 63,636 ($5.77 \times 10^7$) |

*Estimate

Efficiency = $\frac{\text{Mass Poured}}{\text{No. of Valves}}$ (In Mass/Valve Units)

NOTE:
1. In 1986 561,000 tons ($5.09 \times 10^8$ kg) were poured using plug valves; 471 valves were consumed for an average of 1191 tons/valve ($1.08 \times 10^6$ kg/valve); this corresponds to the 1987 plug valve test.
2. Although the ball valve showed better results than the current plug valve, this valve is unreliable in that the sandfill flow can close the valve.
3. Due to the full flow characteristic of the instant valve, turbulence is greatly reduced thereby reducing wear in the sandfill pipe following the valve. An additional cost reduction is also apparent in this area.
4. Efficiency is an arbitrary value designed to compare the approximate lifetimes of the respective valves. Here is the instant valve is expected to last about 56 times longer than the plug valve $\left(\frac{614}{11}\right)$ The estimated number of valves required is based upon extrapolations of the 1986 (Note 1) experience.

the interior of the housing and forming a sealable relationship therebetween, the liner material extending into the support cavities, and means for rotating the disc.

2. The valve according to claim 1 wherein a shaft is circumscribed by a bearing, the bearing circumscribed by the split bushings, the split bushings circumscribed by the liner, and the liner circumscribed by a support cavity.

3. The valve according to claim 1 wherein the central internal diameter of the housing is larger than the diameter of an access port.

4. The valve according to claim 1 wherein the shafts include seals registered against the support cavities.

* * * * *